3,221,166
LOW COUNT RATE RADIO-ACTIVITY ALARM SYSTEMS

Dennis Allenden, Beenham, near Reading, England, assignor to Associated Electrical Industries Limited, London, England, a company of Great Britain
Filed Feb. 11, 1963, Ser. No. 257,411
Claims priority, application Great Britain, Feb. 12, 1962, 5,287/62
5 Claims. (Cl. 250—83.3)

This invention relates to an alarm system for a radio activity air sampling monitor.

Radiation hazards associated with uranium and plutonium arise principally from inhalation and ingestion of these elements in the form of air-borne dust particles.

Monitoring apparatus is already known in which dust is periodically collected from the air by a sampling device and then presented to a detector which operates a counter to show the amount of radioactivity present. Should the counter exceed some specified reading an alarm is operated indicating that the dust contains a dangerous amount of radioactive substance.

There is thus a definite unavoidable time lag before the alarm can be operated and personnel made aware of any danger. This lag consists of the sampling time and the counting or detection time. However, if a reasonable accuracy is to be achieved, results must be based on a fairly large count: thus for low danger levels of radioactivity where there is only a small count rate, fairly long sampling times must be used or the alarm will be operated whenever the statistical fluctuation of the count carries it temporarily over the minimum danger level value.

Known monitoring apparatus of this type has the obvious disadvantage that the alarm time lag must always exceed some unavoidable minimum value since the sampling time must always be completed, whatever the contamination level of the dust, before an alarm can be given. If the time lag were decreased by choosing shorter sampling times, only high contamination levels would give a sufficiently high count to be reliable and operate the alarm so that although these levels would be quickly detected, the low contamination would pass undetected and could exist ad infinitum without any alarm signal being given. The accumulative effects in such a case would of course be disastrous.

It is accordingly an object of the present invention to provide an alarm system in which the sampling time is automatically adjusted to suit the particular contamination level involved.

According to the present invention, a radioactivity alarm system for use with a monitoring apparatus including a dust sampling device and a detector means responsive at the end of each sampling period to the radioactivity level of the sample collected in that period comprises a counter operable by said detector means to indicate said level after a certain counting period has elapsed, a reset device effective to reset said counter to zero at the end of each counting period, an alarm actuated by the counter on exceeding a predetermined maximum count, and switching means actuated by the counter on reaching a predetermined lower count in one of said counting periods temporarily to inhibit the reset device so that the counter counts over a number of successive sampling periods and registers the total count for all these periods. Each counting period conveniently starts at the finish of the corresponding sampling period and occurs during the next sampling period; thus the total count for said successive number of sampling periods is preferably registered after one counting period has elapsed from their completion.

Preferably the said sampling periods are of equal duration to the said counting periods.

In a preferred embodiment, actuation of the switching means by the counter on exceeding said minimum predetermined count inhibits the reset device for an integral number of successive sampling periods substantially equal to the ratio of said predetermined maximum count to said predetermined minimum count.

In order that the invention may be more fully understood reference will now be made to the accompanying drawings in which.

Figure 1:
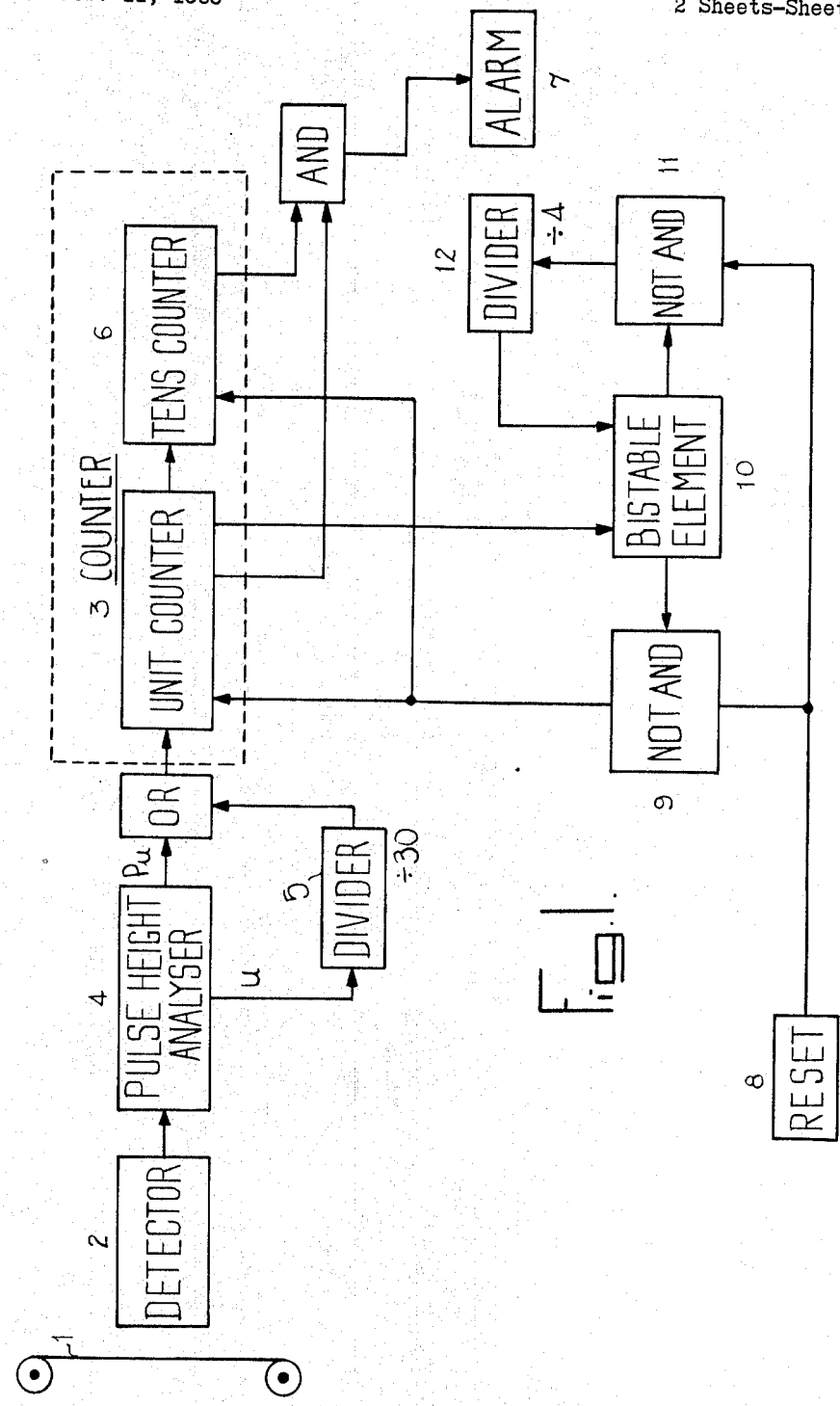
FIG. 1 shows a schematic representation of one embodiment of the invention.

Referring first to FIG. 1, the sampling device preferably includes a paper tape 1 which collects dust samples from the region to be monitored in consecutive five minute periods for example.

The exposed part of the tape is then presented to an α-particle detector 2 whose output pulses are fed through a pulse height analyser 4 and "OR" gate to a counter 3. The Pu pulses are passed directly through the OR gate to the counter but the uranium pulses are divided by thirty by the divider unit 5 and then passed through the OR gate to the counter so that the total count transmitted to counter 3 represents the true radioactive danger involved whether due to uranium or plutonium, it being appreciated that plutonium is about thirty-times more harmful to the human body than uranium.

The counter shown by the dotted lines comprises a units counter 3 in cascade with which is a tens counter 6. By choosing a counting period of the same length as the sampling period, conveniently five minutes, sampling of the present sample and counting of the preceding sample can take place simultaneously.

The combined outputs of counters 3 and 6 are fed through an "AND" gate to an alarm 7. In the embodiment shown if this output represents a count of thirty-seven or more it operates the alarm to show that the radio-activity level is at least four times the maximum permissible concentration, i.e. four M.P.C.

The counters 3 and 6 are set to zero at the end of each counting period by a reset device 8 which feeds an appropriate pulse through a "NOT AND" gate 9.

Should the counter register less than nine counts for the preceding sampling period, then the radioactivity level is known to lie below the minimum danger level of one M.P.C. and the counter is reset to zero and immediately begins to count the next sampling period.

However, if the registered count exceeds 37 counts for the five minute sampling period, then the alarm 7 is operated and personnel are made aware of the danger within ten minutes of its arising, i.e., five minutes sampling time followed by a maximum of five minutes counting time.

Should the count registered for a sampling period lie between nine and thirty-six, it will not be sufficient to operate the alarm although there is probably a dangerous amount of radioactivity of between one and four M.P.C. present in the sample. Accordingly, when the counter registers more than nine counts, a switching device is operated which inhibits the counter reset device so that the counter proceeds to register the total count occurring over four consecutive sampling periods before it is again reset to zero. Thus, if the count per period averages over nine, a total of at least thirty-seven counts will be reached in the extended counting period and the alarm will be operated. However, if the count of nine was attained merely by some statistical fluctuation in the counting rate, a total of thirty-seven counts is unlikely to be reached in the extended time and the alarm will not be operated.

Where the total sampling and counting periods are extended in this fashion, it is to be understood that the first counting period occurs simultaneously with the second sampling period, the second counting period occurs simultaneously with the third sampling period etc. so that the total count is registered within five minutes of the last sampling period.

It is also to be understood that the alarm is operated as soon as the counter registers thirty-seven counts whereas the counting proceeds until the end of the five minute or twenty minute counting period as the case may be so that the radioactivity present can be accurately ascertained.

Thus if the radioactivity is of one M.P.C. the alarm will be operated at the end of the fourth counting period so that personnel are made aware of the danger within twenty-five minutes of its occurring, i.e. twenty minutes sampling time and a twenty minutes counting time extending five minutes beyond the sampling time. Warnings of higher radioactivity will of course be given in a correspondingly shorter time.

The inhibiting device for the reset comprises a bistable element 10 adapted to receive a priming signal from the units counter 3 when this registers a count of nine. This signal actuates element 10 to close the "NOT AND" gate 9, through which reset signals are normally passed to the counters, and open the "NOT AND" gate 11 so that the reset signals are now applied through gate 11 to a divider 12 which in this embodiment of the invention, emits one output pulse for every four input pulses received.

Thus, after four successive counting periods, the divider 12 is triggered to emit a signal pulse which is fed back to the element 10 to restore it to its original state. Element 10 thereupon operates to return "NOT AND" gates 9 and 11 to their original states and subsequent reset signals are once more applied to the counters 3 and 6 through gate 9.

It will be appreciated that although the monitoring apparatus above described has been chosen to operate for levels of one M.P.C. and four M.P.C., the invention is not limited to apparatus operating at these levels. Obviously, the invention could be modified for use at other levels and the dividing unit 12 replaced by some other dividing unit so as to ensure a satisfactory counting extension where necessary.

Figure 2:
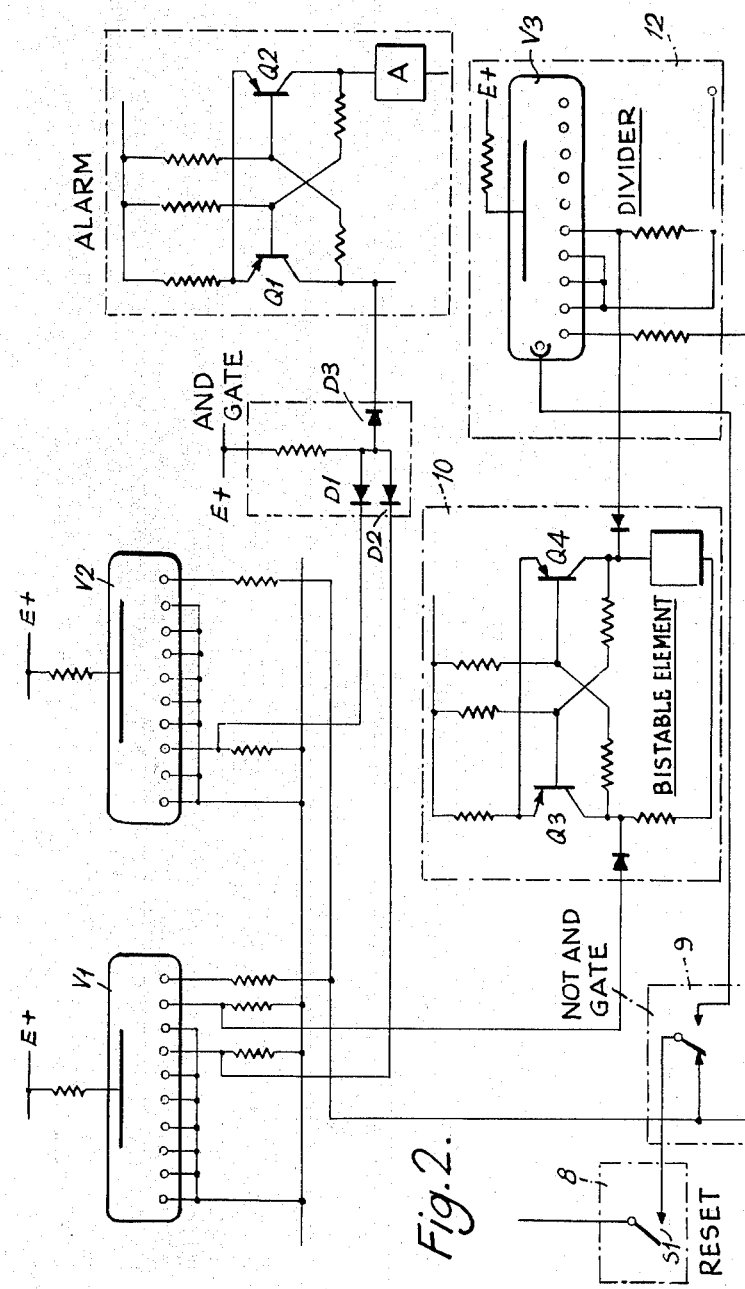
FIG. 2 shows an example of circuits which may be used in the arrangement of FIG. 1.

FIG. 2 is an example of the circuits which may be employed in the blocks shown in FIG. 1 and only those components are shown which are required to understand the invention.

The units and tens counters are indicated as cold-cathode decade tubes, e.g. dekatrons V1 and V2. The circuit of the alarm system comprises a pair of cross coupled transistors Q1 and Q2 forming a trigger circuit.

The operation of the system is as follows.

If an alarm is recorded which for the purposes of explanation constitutes 37 counts, cathodes 3 and 7 of the tens and units counters respectively will carry current and positive voltages will appear at these cathodes. The coincidence is detected by an "AND" gate formed by diodes D1, D2, D3, and produces a positive output signal which changes the state of the alarm binary Q1, Q2 deenergising the alarm relay A. The contacts of A are wired into an external alarm or safety circuit in any desired manner, not shown.

Blocks 9 and 10 in FIG. 1 have their functions performed by relay contacts EW1 of the early warning relay EW.

In normal operation a reset pulse, which may for example be produced by the momentary closure of a microswitch S1, operated by the timing mechanism of the monitor, is applied to the "0" cathodes of the units and tens counters, and resets them to zero at the end of each cycle.

Should an "early warning" count be recorded (assumed equal to 9 counts) a positive signal is fed to the bistable element Q3, Q4, and causes it to change state. Relay EW is de-energised and contacts EW1 change-over. Subsequent reset pulses are fed to the drive electrode of a divider stage V3, which is also shown as a cold cathode decade tube. Hence this tube records the number of reset pulses (and hence the number of sampling cycles) since the operation of the early warning state. Because V1 and V2 are not reset, the counts due to successive samplings are added by these counters.

If an alarm level is reached before the end of the $n$th period $$n = \frac{\text{alarm counts}}{\text{early warning counts}} = 4$$

in the example given the alarm operates as described earlier. Should the alarm count not be reached in 4 periods the early warning is considered to be spurious. The reset pulse at the end of the 4th period steps the divider tube, V3, to cathode 5 and the positive signal at this cathode resets the "bistable element," Q3, Q4 causing EW1 to revert to normal position and reset V1, V2 and V3 restoring the instrument to its normal operating condition.

What I claim is:

1. Radioactivity alarm apparatus including a sampling device, means for exposing said device in a zone under test during sampling periods, means for exposing said device at the end of each sampling period to a pulse emitting detector responsive to the radioactivity level of the sample collected during that period, a digital pulse counter, means for feeding said pulse counter with the pulse output of the detector for a counting period, means for resetting said pulse counter at the end of each counting time period when under safe conditions, an alarm actuated by the counter on exceeding a predetermined safety limit count, switching means, selector means responsive to a predetermined lower count of the counter to actuate the switching means to inhibit the reset device from resetting the counter over a number of successive counting time periods.

2. Radioactivity alarm apparatus including a sampling strip, means for exposing a length of said strip in a zone under test during sampling periods, moving said exposed strip at the end of each sampling period into relationship with a pulse emitting detector responsive to the radioactivity level of the sample collected during that period, a pulse counter fed with the output of the detector, means for resetting said counter at the end of each counting time period when under safe conditions, an alarm actuated by the counter on exceeding a predetermined safety limit count, switching means, selector means responsive to a predetermined lower count of the counter to activate the switching means to inhibit the reset device from resetting the counter over a number of successive counting periods.

3. Radioactivity alarm apparatus including a sampling device, means for exposing said device in a zone under test during sampling periods, means for exposing said device at the end of each sampling period to a pulse emitting detector responsive to the radioactivity level of the sample collected during that period, a digital pulse counter fed with the output of the detector for a counting period, means for resetting said counter at the end of each counting period when under safe conditions, an alarm actuated by the counter on exceeding a predetermined safety limit count, switching means, selector means responsive to a predetermined lower count of the counter to actuate the switching means to inhibit the reset device from resetting the counter over a number of successive counting periods, the number of successive counting periods being substantially equal to the ratio of said predetermined safety limit count to said predetermined lower count.

4. Radioactivity alarm apparatus including a sampling device, means for exposing said device to radiations having different hazard levels and different α energies, means for exposing said device at the end of each sampling period to a pulse emitting detector responsive to the radioactivity level of the sample collected during that period, an analyser device for separating the pulses due to radiations having different hazard levels, means for counting down the pulses due to radiations having lower energy levels in inverse ratio to their hazard levels, a pulse digital counter fed with all said pulses, means for resetting said counter at the end of each counting time period when under safe conditions, an alarm actuated by the counter on exceeding a predetermined safety limit count, switching means, and selector means responsive to a predetermined lower count and adapted to actuate the switching means to inhibit the reset device over a number of successive counting periods.

5. Radioactivity alarm apparatus including a sampling device, means for exposing said device to uranium and plutonium radiations during sampling periods, means for exposing said device at the end of each sampling period to a pulse emitting detector responsive to the radioactivity levels of the sample collected during that period, an analyser device for separating the respective pulses due to uranium and plutonium radiations, means for counting down the pulses due to the uranium radiation by an amount proportional to the ratio of their hazard energies relative to that of plutonium, a digital pulse counter fed with all said pulses, means for resetting said counter at the end of counting time periods when under safe conditions, an alarm actuated by the counter on exceeding a predetermined safety limit count, switching means, and selector means responsive to a predetermined lower count of the counter and adapted to actuate the switching means to inhibit the reset device over a number of successive counting periods.

References Cited by the Examiner
UNITED STATES PATENTS

| | | | |
|---|---|---|---|
| 2,874,305 | 2/1959 | Wilson | 250—83.6 |
| 2,963,588 | 12/1960 | Wilson | 250—83.6 |
| 3,048,820 | 8/1962 | Derr | 340—163 |
| 3,093,738 | 6/1963 | Mann | 250—83.6 |

RALPH G. NILSON, *Primary Examiner.*

JAMES W. LAWRENCE, *Examiner.*